United States Patent

Ayella

[15] 3,674,733

[45] July 4, 1972

[54] COLORED HEAT SHRINKABLE ELASTOMERIC TUBING

[72] Inventor: Edmond R. Ayella, Philadelphia, Pa.

[73] Assignee: Penntube Plastics Company, Clifton Heights, Pa.

[22] Filed: Feb. 2, 1970

[21] Appl. No.: 8,021

[52] U.S. Cl. .................260/30.6, 260/31.2, 260/31.4 R, 260/31.8 DR, 260/41.5 R, 260/41.5 A, 260/92.3, 260/890, 264/95, 264/176, 264/230
[51] Int. Cl. .................C08d 11/02, B29c 17/07, B29c 13/00
[58] Field of Search ...............260/890, 92.3, 41.5 A, 30.6 R, 260/31.2 MR, 31.4 R, 31.8 DR; 264/230, 95

[56] References Cited

OTHER PUBLICATIONS

Murray et al.- The Neoprenes (duPont) (Wilmington, Del.) (1963); pages 9, 31, 34- 40, 77- 78, 80- 81, 83, 86- 88. TS1925M8.

Davis et al.- Chem. & Techn. of Rubber (Reinhold) (N.Y.) (1937); pages 128- 130, 705- 706, 709- 711, 715- 719. TS1890D2J.

Maynard et al.- J. Pol. Sci. 18, 227- 234 (1955). QD281P6J6.

Primary Examiner—Morris Liebman
Assistant Examiner—H. H. Fletcher
Attorney—Morgan, Finnegan, Durham & Pine

[57] ABSTRACT

This invention relates to polychloroprene based colored heat shrinkable elastomeric tubing having excellent electrical properties and to the method of manufacture.

8 Claims, No Drawings

COLORED HEAT SHRINKABLE ELASTOMERIC TUBING

The invention relates to colored heat shrinkable elastomeric articles having excellent electrical insulation properties and to a method of preparing such articles. The articles have numerous uses. For example, heat shrinkable tubing can be placed over pipe joints and can then be shrunk thereby providing a tight fitting protective cover. Another use of heat shrinkable tubing is the harnessing and jacketing of electrical wires. The articles are elastomeric, both before and after deforming, and thus have the usual advantages which this property imparts. The colored nature of the product and the ability to color the product as desired, gives an outstanding advantage in that they may be color-coded for various electrical purposes.

The articles are formed from a homogeneous blend of two components, (1) a cured polychloroprene elastomer, and (2) a polychloroprene elastomer having a Williams Plasticity Number (ASTM-D-926-56) of at least 1,000 at 100° F. and less than 350 at 150° F. The amount of each component in the blend should be between 10 percent and 90 percent (all percentages herein are by weight) of the total blend. Preferably the amount of component (1) is 10 to 50 percent, and the amount of component (2) is 50 to 90 percent.

The chloroprene polymer of component (1) can be any of the conventional solid chloroprene polymers, such as those marketed commercially under the trademark "Neoprene." They can be the sulfur modified chloroprene polymers, most of these being known commercially as the "G" types, or can, if desired, not contain sulfur in the polymer chain, most of these latter types being known commercially as the "W" types. The uncured elastomers of component (1) normally have a molecular weight distribution of 20,000 to over 1,000,000 with the most abundant molecular species being in the range of 80,000 to 250,000 (I. and E.C., 43, 154–157, 1951). The polymers are normally (before curing) soluble in benzene. They are also solid as this latter term is defined in U.S. Pat. No. 3,147,318, with their Mooney viscosity preferably being 35 to 65 at 158° F. (ML – 2.5 min.). The methods of preparing these chloroprene elastomers are well-known to those skilled in the art; see, for example, U.S. Pat. Nos. 3,042,652; 3,147,317; 2,494,087; 2,481,044; 2,914,497; 2,567,109; and 2,831,842. More specifically, see the first chloroprene polymer preparation described in Example I of U.S. Pat. No. 3,147,318.

Component (2) is a chloroprene polymer having a rapid change in its Williams Plasticity Number. At 100° F., the Williams Plasticity Number is at least 1,000, whereas at 150° F. it is less than 350, preferably less than 300, more preferably less than 250. Component (2) is distinguished from the polymer of component (1) (before curing) in that at about 150° F. its Williams Plasticity Number is lower than that of component (1), usually by at least 50 units, whereas at about 120° F. the reverse is true, i.e., at this temperature the Williams Plasticity Number of component (2) will be about 1,000 or higher whereas that of component (1) will be substantially less than 1,000, say 500 to 700. Preferably the Williams Plasticity Number of component (2) is about 150 to 250 at 150° F. and over 1,000 at 120° F. and the Williams Plasticity Number of component (1), before curing, is about 375 to 475 at 150° F. and 500 to 900 at 120° F.

The polymers of component (2) also have a fast rate of crystallization as this is characteristic of chloroprene polymers having a rapid change in Williams Plasticity Number. The polymers of component (2) are prepared in conventional manner but at a polymerization temperature not higher than about 50° F. It is well known that rapid crystallizing polymers, i.e., those exhibiting a rapid change in Williams Plasticity Number, are prepared at low temperatures whereas the more slowly crystallizing polymers are usually prepared at about 110° to 125° F. Suitable means of preparing the polymer of component (2) are described in Maynard et al, Journal of Polymer Science, Vol. 18, pp. 227–34 (1955) and U.S. Pat. Nos. 2,417,034; 2,426,854; and 2,567,117. Such polymers are also widely available commercially, e.g., that marketed under the trademark "Neoprene HC" by the duPont Company.

A representative example of this component (1) polymer is one prepared in accordance with the procedure of U.S. Pat. No. 3,147,317 and being a tan-colored, soft, friable crystalline solid which melts at 104° F. to a viscous amber-colored fluid. It has a Brookfield viscosity at 122° F. of 550,000 cps; 200,000 cps at 158° F. and 75,000 cps at 194° F. It has an intrinsic viscosity in benzene at 80° F. of less than 0.15.

The articles of the invention are formed by first mixing component (1) with component (2) in any conventional rubber milling device. During this mixing step, the curing agent is also added. Any of the conventional chloroprene elastomer curing agents may be employed such as magnesium, lead and zinc oxides, alone or in combination with conventional accelerators such as 2-mercaptoimidazoline. Preferably from 5 to 15 parts of zinc oxide, from 1 to 3 parts of magnesium oxide and from 1 to 2 parts of 2-mercaptoimidazoline are added per 100 parts by weight of total chloroprene polymer content.

To obtain the colored electrically insulative heat shrinkable tubing of this invention, there should also be added to the chloroprene at the milling stage, a quantity of silica and a quantity of aluminum silicate. The silica can be added in the anhydrous or the hydrated form and will be present in an amount, calculated on the anhydrous basis, of from about 15 to 30 parts, preferably 15 to 25 parts per hundred parts by weight of the total chloroprene. The silica will be in a particle size of not more than about 0.03 micron. The lower limit on particle size is not critical but from a practical standpoint, the minimum particle size will be about 0.005 micron.

The aluminum silicate to be added to the chloroprene can also be either in the hydrous or anhydrous form. On the basis of the 10 percent hydrous material, there should be from about 20 to 35 parts of aluminum silicate by weight per 100 parts by weight of total chloroprene. The particle size of the aluminum silicate should be less than about 2 microns and preferably greater than 0.005 micron.

There is also preferably added to the material during the mixing stage, particularly wherein reinforcement is desired, a quantity of calcium carbonate within the range of about 7 to 15 parts by weight per 100 parts of total chloroprene polymer.

At this mixing stage, also, particularly where low temperature properties are desired, a polyvinyl chloride plasticizer can be added in an amount of from about 10 to 20 parts by weight, preferably at least 15 parts per 100 parts of total chloroprene polymer. Preferred plasticizers include dioctyl phthalate, dioctyl sebacate, butyl laurate, dibutyl sebacate, di-isoctyl adipate, butyl oleate, trioctyl phosphate, the polyether product sold as Thiokol Chemical TP90B, butyl acetyl ricinoleate, tetraethyl glycol-di-2-ethyl hexoate and tributoxy ethyl phosphate.

The color is also imparted at this stage by the addition of one or more organic pigments compatible with the chloroprene polymers. The nature of the pigments and the amounts used are such as to enable development of the appropriate and desired color. A total of no more than about 5 parts of total pigment by weight should be used per 100 parts of total chloroprene polymer. The lower limit will depend on the desired color.

Representative pigments include the following:
1. Ultramarine blue — specific gravity 2.35
2. VS644 green MB
Color Index 74260
Phthalocyanine Pigment No. 7
3. VS825 yellow MB
Color Index 21090
Benzidine AAA Pigment No. 12
4. VS524 blue M13
Color Index 74160
Phthalocyanine Pigment No. 15
5. V204 red MB
Color Index 15630
Calcium Lithol Pigment No. 49
6. V105 orange MB Color Index 21110
Benzidine Pigment No. 13

If desired, other additives desired, such as from one-half to 1½ parts stearic acid as a lubricant and from 1 to 3 parts of a rubber antioxidant per 100 parts of total chloroprene, are also added in the milling step. However, it is preferred that, except as indicated herein, no other polymers other than chloroprene polymers be included in the composition. Chloroprene elastomers have desirable properties peculiar to themselves and these properties are usually reduced or lost by the inclusion of substantial amounts of other polymers.

After the milling step is complete, i.e., after the blend is homogeneous, the blend is formed into the desired shape. If, for example, heat shrinkable tubing is desired, the blend is extruded into tubing on a conventional elastomer extruder. The indicated extrusion temperature will usually be about 170° F. but will vary from about 160° to 180° F. depending upon the desired shape of the article, the composition of the material, and the like.

The shaped blend is then cured. This is accomplished in a conventional manner but most extruded goods are usually cured in open steam for 20 to 120 minutes, although the time will vary depending upon such factors as the thickness of the article and the like. Alternatively, other curing means such as hot air, irradiation and the like may be employed if desired. Although the extent of curing will vary depending upon the use to which the ultimate article is to be put, it will usually be such that at room temperature the blend will have a tensile strength of at least 500 psi, preferably at least 1,500 psi.

The shaped and cured blend is then expanded into the desired shape. This is effected in any convenient manner, but normally involves the application of air pressure or mechanical pressure while maintaining the temperature at about 150° to 200° F. Die tubes of the required internal dimension can be used to maintain the proper expanded dimension.

If the tubing is expanded in open air, without use of restraining means such as a die tube, the tubing may be softened either by heating or through treatment with a suitable solvent such as methylene chloride. If the tubing is softened by heating, one end of the tubing should be clamped off and then air or mechanical pressure is used to expand the tubing to the desired extent. The tubing should be allowed to cool to room temperature before the pressure is relieved. This permits the expanded dimension to be retained.

If a solvent is used, some of the solvent is allowed to dry out of the tubing and then the same procedure is followed.

If the tubing is expanded through a die tube, the die tube is maintained at a temperature between 150° and 200° F., preferably at 175° F. Air or mechanical pressure is applied at one end of the die tube while the tubing passes through the die tube, with the other end of the tubing clamped off. The tubing is allowed to cool to room temperature and the pressure is then released.

In the expanded state, the article is elastomeric, i.e., it has the characteristic property of rubber in that it deforms under relatively small force but returns to essentially its original configuration when the force is relieved.

The expanded article can now be shrunk merely by heating. Normally, heating to about 125° F. will cause some shrinkage will full shrinkage occurring at about 160° F. Full shrinkage means shrinking to close to the original shape, i.e., the shape of the article before the expansion step. Shrinkage will occur, depending on the temperature, in an amount such that the ratio of expanded to recovered diameter will be preferably at least 1.5 and more preferably at least 2.

In some cases, it may be observed that the milling of component (1) and component (2) together takes longer than is desired. This sometimes occurs because these two components are not always as compatible as they might be. In such cases the milling time can be reduced by the addition to the blend of a fluid chloroprene polymer. These polymers are prepared as described in U.S. Pat. No. 3,147,317 but, in general, are prepared in the same manner as the polymer of component (1) except that a sufficient amount of a conventional chain transfer agent is used to reduce the viscosity, say about five parts of a xanthogen disulfide per 100 parts of chloroprene. These fluid chloroprene polymers have an intrinsic viscosity in benzene at 80° F. of less than 0.15. They can also be described as fluid because they are pourable at 130° F. When a fluid chloroprene polymer is used to improve the processability, it should only be used in about 1 to 15 percent based on the total weight of the three chloroprene components. Preferably, the amount used is only about 5 percent. Rather than use a fluid chloroprene polymer, other pourable (at 130° F.) elastomeric polymers, such as polyacrylonitrile and butadiene-acrylonitrile copolymers, can be used, but for the reason mentioned before, it is desirable to limit the composition to polychloroprenes.

As mentioned before, the amount of component (2) should be 10 to 90 percent. However, the ability of the articles of the invention to retain their expanded shape but yet deform on heating is due to the presence of component (2). Accordingly, in all cases, the amount of component (2) should be sufficient to achieve this characteristic, that is, if insufficient component (2) is used, it will not remain expanded, or, stated in another manner, it will not permit deformation by heat.

The tubing may be crosslinked, if desired, by conventional means. Crosslinking before expansion will generally permit a greater degree of expansion of the tubing of this invention. Any conventional means known for use in crosslinking chloroprene polymers such as, for example, the use of irradiation and the use of chemical crosslinking agents, may be employed. Where chemical crosslinking agents are employed, the crosslinking action may be accelerated by heating, as, for example, at a temperature of from 250° to 310° F. for from 20 minutes to 2 hours.

The following examples are illustrative of the invention with all parts being by weight:

EXAMPLE I

This example illustrates the preparation of green colored heat shrinkable tubing.

Preparation of Component (2)

Component (2) described previously is prepared as follows: An emulsion of chloroprene (100 parts), dodecyl mercaptan (0.2 part), disproportioned rosin (5 parts), water (150 parts), caustic soda (0.75 part), sodium salt of formaldehydenaphthalene sulfonic acid condensate (0.5 part), and sodium sulfite (0.5 part) is prepared. Polymerization is effected in a conventional reactor and under a nitrogen atmosphere by the addition of 3 parts of catalyst which is a mixture containing 1.2 percent potassium ferricyanide and 98.8 percent water. Catalyst is added slowly while maintaining the polymerization temperature at 32° F. At about 90 percent monomer conversion polymerization is stopped by the addition of a mixture of phenothiazine and 4-tert-butylcatechol. The latex is then stabilized by the addition of 1.5 parts water, 0.2 part sodium laurylsulfate, 1.5 parts tetraethyl thiuram disulfide, 2 parts toluene, and 0.05 part of the sodium salt of formaldehyde-naphthalene sulfonic acid condensate. Unreacted chloroprene is removed by steam stripping, the polymer is acidified with acid, and is then removed by freeze coagulation. The polymer has a Williams Plasticity Number at 100° F. of over 1,250, at 150° F. of 240, and at 120° F. of greater than 1,000.

Preparation of Component (1)

A polymer suitable as component (1) is prepared as in Example I of U.S. Pat. No. 3,147,317. This preparation is substantially the same as in the preparation of component (2) above, except for the catalyst employed and the polymerization temperature. The latter is 122° F. and this results in a polymer which does not have the plasticity-crystallization characteristics possessed by the polymer prepared in Example I. The polymer has a Williams Plasticity Number in excess of 1,000 at 100° F. but it is also well in excess of 500 at 150° F.

Blending

The following materials are blended in a conventional rubber mill at 150° F. for 30 minutes.

|  | Parts by Weight |
|---|---|
| chloroprene component (2) | 67.5 |
| chloroprene component (1) | 25.0 |
| butadiene acrylonitrile copolymer (Hycar 1312) | 5.0 |
| magnesium oxide | 2.0 |
| stearic acid | 0.5 |
| 2,2' methylene bis(4-methyl-6t-butyl phenol) | 1.5 |
| hydrated aluminum silicate | 25.0 |
| hydrated silica | 25.0 |
| calcium carbonate | 10.0 |
| Vansul VS-644, green pigment | 0.5 |
| ultramarine blue | 1.0 |
| 2-mercaptoimidazoline | 1.5 |
| zinc oxide | 10.0 |
| dioctyl phthalate | 16.0 |

Extruding and Expanding

After blending, the mixture is extruded at 160° to 180° F., preferably about 170° F., into tubing having an I. D. of one-half inch and a wall thickness of 0.150 inch. The tubing is then cured for twenty minutes with 60 psig. steam. Finally, air pressure is used to expand the tubing to 2 inches I. D., the expansion being conducted with the tubing heated to between 150° F. and 200° F., preferably about 175° F., and one end pinched closed and the other connected to an air supply. A die tube was used to control the size of the expanded tubing. It is, however, not essential. The tubing is water-cooled to room temperature, the air pressure then released, and the tubing stays in the expanded form. The expanded tubing is elastomeric. When air at 170° F. is blown on the tubing, it immediately shrinks within several seconds to an I. D. of one inch or less. The shrunken tubing is also elastomeric.

EXAMPLE II

This example is the same as Example I except the polymer used as component (2) is the commercially available polymer known as "Neoprene HC," and the polymer used as component (1) is the commercially available polymer known as "Neoprene AC."

The electrical properties of the green tubing prepared in accordance with this example are as follows:

| dielectrical strength - ASTM–D149 | 886 volts/mil |
|---|---|
| volume resistivity-ASTM-D257 | 5.1 × 10$^{10}$ ohm-cm |
| dielectric constant - ASTM–D150 | 2.63 |
| heat resistance - 24 hrs. at 100° C. followed by test for dielectric strength | 860 volts/mil |
| fluid resistance - 24 hrs. at 24° C. in following: | dielectric strength |
| hydraulic fluid Mil-H-5606 | 880 volts/mil |
| J P 4 fuel | 900 |
| lube oil Mil-L-7808 | 870 |
| lube oil Mil-L-23699 | 1010 |
| 5% sodium chloride | 890 |
| de-icing fluid Mil-A-8243 | 860 |

Similar results can be obtained except for the difference in color if the Vansul VB-644 green pigment is removed and the ultramarine blue remains as the sole pigment. If different colors are desired, different pigments can be substituted for the Vansul VB-644 green and ultramarine blue used in these examples. For example:

| For Color | Substitute in Formulation | Parts by Weight |
|---|---|---|
| Yellow | Vansul VS-825 Yellow MB | 1.0 |
| Blue | Vansul S-524 Blue | 1.5 |
| Red | Vansul V-204 Red MB | 1.0 |
| Orange | Vansul V-105 Orange MB | 1.5 |

EXAMPLE III

The procedure is the same as in Example II except that 7.5 parts of a fluid chloroprene polymer commercially available as Neoprene FC having a Brookfield viscosity of 550,000 at 122° F. is added to the mill in place of the Hycar 1312. Similar results are obtained. The blend on milling becomes uniform less rapidly but results are otherwise similar if both the Hycar 1312 and the Neoprene FC are completely omitted.

I claim:

1. Colored, heat shrinkable elastomeric tubing having excellent electrical properties comprising a cured mixture of two chloroprene polymers and, per 100 parts by weight of total chloroprene polymer content, from about 15 to 30 parts by weight of silica, from 20 to 35 parts by weight of aluminum silicate and up to 5 parts by weight of a pigment, said chloroprene polymers comprising (a) from about 10 to 90 percent by weight of a curable polychloroprene elastomer, and (b) from about 10 to 90 percent by weight of a polychloroprene elastomer having a Williams Plasticity Number at 100° F. in excess of 1,000 and at 150° F. of less than 350, said tubing being further characterized in that upon the application of heat it will shrink but retain its elastomeric character.

2. Tubing according to claim 1 wherein the Williams Plasticity Number of (b) at 150° F. is less than 300.

3. Tubing according to claim 1 wherein the amount of (b) is 50 to 90 percent and the amount of (a) is 10 to 50 percent.

4. Tubing according to claim 1 wherein the Williams Plasticity Number of (b) at 150° F. is at least 50 units less than the Williams Plasticity Number at 150° F. of (a) before said curing.

5. Tubing according to claim 1 further characterized in that the Williams Plasticity Number of (b) at 120° F. is at least 1,000 whereas the Williams Plasticity Number of (a) before said curing is substantially less than 1,000.

6. Tubing as in claim 1 also containing from about 7 to 15 parts by weight of calcium carbonate per 100 parts of total chloroprene polymer.

7. Tubing as in claim 1 also containing from about 10 to 20 parts by weight of a polyvinylchloride plasticizer per 100 parts of total chloroprene polymer.

8. Tubing as in claim 1 being further characterized by a ratio of expanded to recovered diameter of at least 2.

* * * * *